United States Patent [19]

Van Diest et al.

[11] Patent Number: 5,300,268
[45] Date of Patent: Apr. 5, 1994

[54] PROCESS FOR THE MANUFACTURE OF AQUEOUS SOLUTIONS OF FERRIC CHLORIDE

[75] Inventors: Jacques Van Diest, Rhode-Saint-Genese; Jacques Brahm, Grimbergen, both of Belgium

[73] Assignee: Solvay (Société0 Anonyme), Brussels, Belgium

[21] Appl. No.: 889,919

[22] Filed: May 29, 1992

[30] Foreign Application Priority Data

Jun. 6, 1991 [BE] Belgium .............................. 09100550

[51] Int. Cl.⁵ .............................................. C01G 49/10
[52] U.S. Cl. .................................. 423/150.1; 423/493
[58] Field of Search ................. 423/150.1, 493, 132, 423/139, DIG. 16, 147, 140, 148, 149

[56] References Cited

U.S. PATENT DOCUMENTS

| | | | |
|---|---|---|---|
| 3,725,527 | 4/1973 | Yamamura et al. | 423/139 |
| 3,873,678 | 3/1975 | McCormick et al. | 423/493 |
| 4,066,748 | 1/1978 | Lietard et al. | 424/147 |
| 4,530,819 | 7/1985 | Czegledi et al. | 423/112 |
| 4,997,533 | 3/1991 | Kawatra et al. | 204/113 |
| 5,118,489 | 6/1992 | Clair et al. | 423/493 |

FOREIGN PATENT DOCUMENTS 734081 7/1955 United Kingdom .
409847 5/1984 United Kingdom .

OTHER PUBLICATIONS

Hydrometallurgy, vol. 23, No. 1, Oct. 1989, Amsterdam NL, pp. 77–90, G. Patermarakis: "The Leaching of Iron Oxides in Boehmitic Bauxite by Hydrochloric Acid".

*Primary Examiner*—David Brunsman
*Attorney, Agent, or Firm*—Spencer, Frank & Schneider

[57] ABSTRACT

A process for the manufacture of an aqueous solution of ferric chloride including the steps of introducing an aqueous solution of hydrochloric acid into a reactor containing a bed of fragments of an oxide-containing iron ore so that the aqueous solution of hydrochloric acid travels upwardly through the bed, collecting a suspension of ore particles in an aqueous solution of ferric chloride from the bed mechanically separating the ore particles from the aqueous solution of ferric chloride of the suspension, and recycling the ore particles by adding the ore particles to the aqueous solution of hydrochloric acid upstream of the bed.

6 Claims, 1 Drawing Sheet

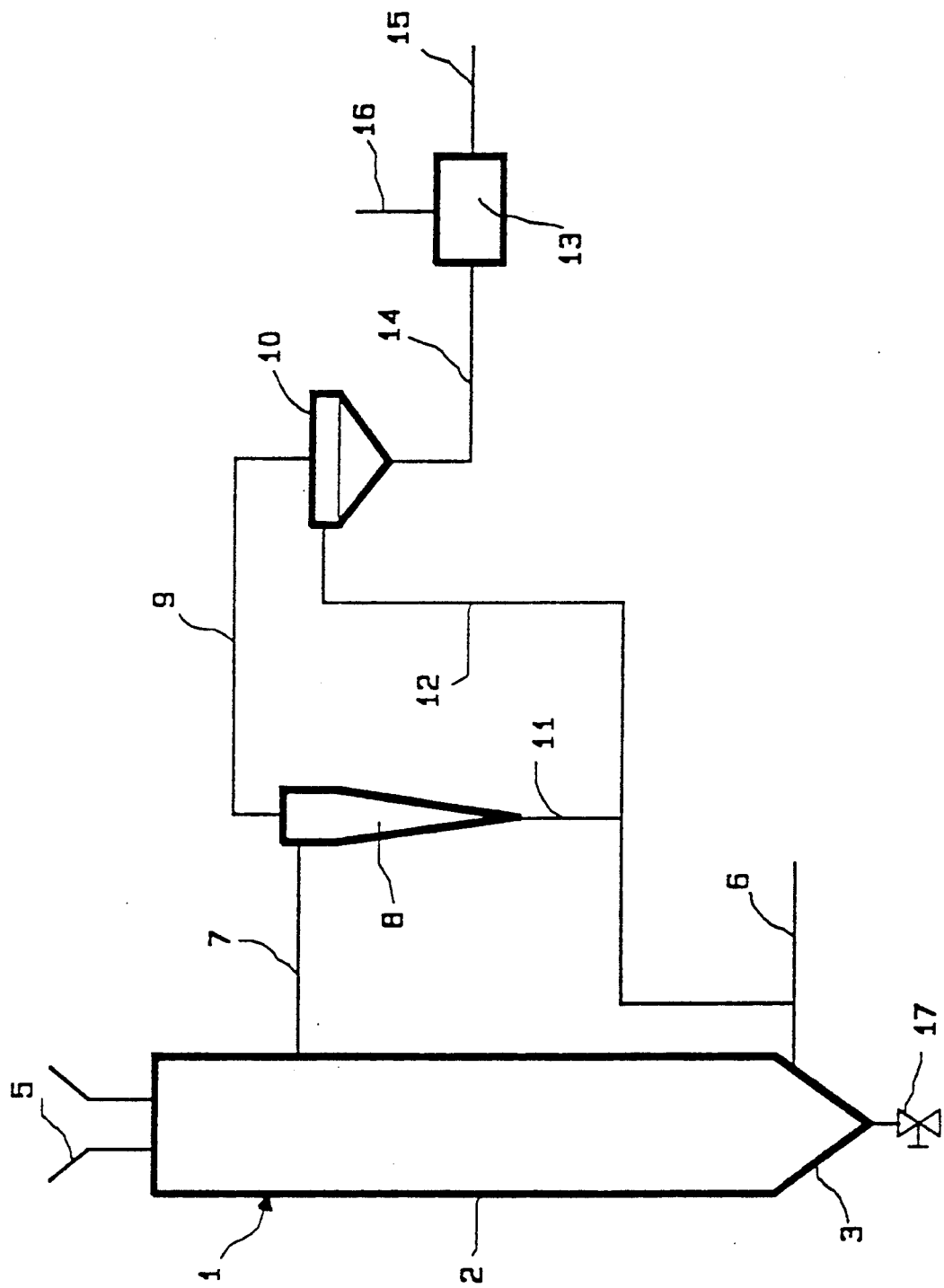

PROCESS FOR THE MANUFACTURE OF AQUEOUS SOLUTIONS OF FERRIC CHLORIDE

BACKGROUND OF THE INVENTION

The invention relates to a process for the manufacture of aqueous solutions of ferric chloride.

DESCRIPTION OF THE RELATED ART

In order to manufacture aqueous solution of ferric chloride, it is proposed, in document GB-A-734,081 (The United Steel Companies Ltd), to dissolve an iron ore in an aqueous solution of hydrochloric acid and then to filter the resulting aqueous suspension on a filter, in order to separate therefrom the insoluble matter which it contains. In this known process, the insoluble matter in the suspension forms the gangue of the ore and its volume is large, and this requires filtration using filters of large capacity.

In document GB-A-409,847 (Peter Spence & Sons, Ltd), an ilmenite ore is used in the form of a bed of fragments on a grid and a stream of hydrochloric acid is percolated through the bed. In this known process the iron and the titanium in the ore go into solution and the insoluble matter of the gangue of the ore is entrained with the solution, and this results in the disadvantage referred to above. Moreover, ore particles still containing iron and titanium oxides are unavoidably entrained and discharged with the insoluble matter, and this has a negative effect on the efficiency of the process.

The invention is aimed at remedying the above-mentioned disadvantage by providing a new process for the manufacture of aqueous solutions of ferric chloride starting from oxide-containing iron ores, which can be carried out continuously, which makes it easier to separate the insoluble matter and which exhibits an improved efficiency when compared with that of the known processes.

SUMMARY OF THE INVENTION

Consequently, the invention relates to a process for the manufacture of aqueous solutions of ferric chloride, in which an aqueous solution of hydrochloric acid is circulated through a bed of fragments of an oxide-containing iron ore; according to the invention, the aqueous solution of hydrochloric acid is subjected to an upward travel through the bed, a suspension of ore particles in an aqueous solution of ferric chloride is collected from the bed, the suspension is treated in order to extract the particles therefrom, the particles and the solution of ferric chloride are collected separately and the particles are recycled into the aqueous solution of hydrochloric acid.

DESCRIPTION OF THE PREFERRED EMBODIMENTS

In the process according to the invention the iron ore must be an oxide-containing ore. It is preferred to employ a haematite ore, such as those used in the iron and steel industry. The ore may be employed as it is or after it has undergone an operation of enrichment in iron oxide. An ore containing 96% by weight of haematite is advantageously employed, such as those extracted from deposits situated in South America.

The ore is used in the form of a bed of fragments. This is generally a stationary bed. It is desirable to employ a calibrated ore which has a narrow particle size distribution. The latter is determined by the operating conditions of the process, especially by the upward velocity of the solution of hydrochloric acid through the bed. It is recommended, for example, to employ an ore whose mean particle size, defined by screening, is between 1 and 10 mm or between 3 and 30 mm.

The source and the concentration of the hydrochloric acid solution is not critical. Aqueous solutions which can be employed in the process according to the invention are those in which the weight content of hydrochloric acid is higher than 20%, preferably at least 26%. Aqueous solutions containing 34% of hydrochloric acid have the advantage of making it possible to obtain directly commercial aqueous solutions containing 40% by weight of ferric chloride.

The temperature in the bed must be sufficient to initiate the reaction of iron oxide with hydrochloric acid. For this purpose, it is advantageous to produce in the bed a temperature higher than 50° C., preferably at least 75° C. It is appropriate, however, to avoid excessively high temperatures, which would result in the formation of considerable quantities of hydrogen chloride vapours. Temperatures between 75° and 150° C. are therefore recommended. In the case of elevated temperatures it is desirable to work at a pressure above atmospheric pressure.

During its travel through the bed, the solution of hydrochloric acid reacts with the iron oxide in the ore, forming ferric chloride which goes into solution. An aqueous solution of ferric chloride is obtained as a result. The solution of ferric chloride entrains fine ore particles. The latter originate from the abrasion of the ore fragments and from the fragmentation of the latter during the reaction of iron oxide with hydrochloric acid, and they generally contain a quantity of iron oxide which is not negligible. As a result, a suspension of ore particles in an aqueous solution of ferric chloride is collected at the exit of the bed. According to the invention this aqueous suspension is treated in order to extract separately therefrom, on the one hand, the aqueous solution of ferric chloride and, on the other hand, the ore particles, and these ore particles are recycled in the aqueous solution of hydrochloric acid, upstream of the ore bed. The extraction of the ore particles from the aqueous suspension may be performed by any suitable mechanical means of separation, for example by settling, centrifuging or filtration.

In the present specification the expressions "upstream" and "downstream" are defined in relation to the direction of travel of the aqueous solution of hydrochloric acid, of the suspension, or of the aqueous solution of ferric chloride.

In another particular embodiment of the process according to the invention the aqueous solution of ferric chloride collected after extraction of the ore particles is subjected to a partial evaporation in order to concentrate it. This embodiment of the process according to the invention makes it possible to employ dilute aqueous solutions of hydrochloric acid.

The implementation of the process according to the invention involves the use of a reactor in communication with a device for allowing the ore to enter, a device for allowing the aqueous solution of hydrochloric acid to enter and a device for extraction of the suspension of particles, which is in communications with a mechanical separator for the particles in the suspension in order to release the aqueous solution of ferric chloride.

The invention consequently also relates to a plant for the manufacture of aqueous solutions of ferric chloride, in which the abovementioned reactor comprises a vertical tubular enclosure, the device for allowing the ore to enter comprises a hopper arranged above the enclosure, the device for allowing the aqueous solution of hydrochloric acid to enter comprises a conduit opening into the lower part of the enclosure and the device for extraction of the aqueous suspension of particles comprises a conduit which opens into the upper part of the enclosure and which is in communication, downstream of the enclosure, with the mechanical particle separator, the said separator being connected to the entry conduit for the aqueous solution of hydrochloric acid.

In the plant according to the invention, the lower part and the upper part of the enclosure are intended to denote the regions of the latter which are situated below and above the middle of its working height respectively, the working height of the enclosure being the height of the ore charge in the enclosure when the plant is operating normally.

The particle separator is not critical and may be, for example, a settler, a centrifugal drier, a filter or a combination of these devices.

In a preferred embodiment of the plant according to the invention the mechanical separator comprises a hydrocyclone and a filter coupled in series.

The process and the plant according to the invention enable concentrated solutions of ferric chloride to be produced easily, with a high production efficiency and in a high yield.

Special features and details of the invention will emerge from the following description of the single Figure of the attached drawing, which shows diagrammatically an embodiment of the plant according to the invention.

BRIEF DESCRIPTION OF THE DRAWING

The plant shown in the Figure comprises a reactor 1 consisting of a tubular enclosure 2 extended, at its lower part, by a conical surface 3.

Above the enclosure 2 is a hopper 5 employed for feeding the reactor 1 with ore.

A conduit 6 opens into the lower part of the reactor 1, in the neighbourhood of the junction between the wall of the tubular enclosure 2 and the conical surface 3. It is intended to feed the reactor with aqueous solution of hydrochloric acid.

A conduit 7 connects the upper part of the enclosure 2 to a hydrocyclone 8. The cyclone 8 is connected, in its axial upper part, to a conduit 9 which opens onto a filter 10. A conduit 11 connects the lower part of the cyclone 8 to the conduit 6.

The filter 10 may be, for example, a filter press or a belt filter. It is intended to treat an aqueous suspension collected from the cyclone in order to separate the insoluble matter therefrom. It is connected to the conduit 6 via a conduit 12 and to an evaporator 13 via a conduit 14.

During the operation of the plant described above, the enclosure 2 is fed with a calibrated haematite ore so as to form a bed of ore fragments whose level is situated in the neighbourhood of, or preferably above, the level of the conduit 7. Furthermore, an aqueous solution of hydrochloric acid is introduced via the feed conduit 6.

The aqueous solution of hydrochloric acid is forced to travel, by means of a pump which is not shown, from the bottom upwards in the chamber 2 where it passes through the ore bed and converts the haematite into ferric chloride which goes into solution. The flow rate of the hydrochloric acid solution is adjusted so as to make the ore bed a stationary bed. An aqueous solution of ferric chloride is collected via the draw-off conduit 7. It entrains fine ore particles which originate especially from the abrasion to which the ore is subjected while it is being charged into the enclosure 2. A suspension of ore particles in an aqueous solution of ferric chloride is obtained as a result. This suspension is directed, via the conduit 7, into the hydrocyclone 8, where a separation of the ore particles from the ferric chloride solution takes place. The ore particles are drawn off from the cyclone via the conduit 11 and are recycled into the conduit 6. The aqueous solution of ferric chloride collected from the cyclone is directed, via the conduit 9, onto the filter 10, to remove the very fine ore particles which it might still contain. The solid particles separated on the filter are recycled into the hydrochloric acid solution via the conduit 12. The filtered ferric chloride solution collected from the filter 10 is directed to an evaporator 13, from which a concentrated solution of ferric chloride 15 and steam 16 are drawn off. The steam 16 can be employed for preheating the aqueous solution of hydrochloric acid flowing in the conduit 6.

During the implementation of the process, insoluble matter from the iron ore accumulates gradually in the bottom of the conical zone 3, from which it is periodically drawn off by means of a valve 17. The opportune time for operating the valve 17 and drawing off the insoluble matter from the reactor can be easily determined by measuring the temperature prevailing in the tubular chamber 2. A fall in the temperature below a set value constitutes, in fact, an indication that it is the time to draw off insoluble matter.

What is claimed is:

1. A process for the manufacture of an aqueous solution of ferric chloride, comprising:
   a. introducing an aqueous solution of hydrochloric acid into a reactor containing a bed of fragments of an oxide-containing iron ore so that the aqueous solution of hydrochloric acid travels upwardly through the bed;
   b. collecting a suspension of ore particles in an aqueous solution of ferric chloride from the bed;
   c. mechanically separating the ore particles from the aqueous solution of ferric chloride of the suspension; and
   d. recycling the ore particles by adding the ore particles to the aqueous solution of hydrochloric acid upstream of the bed.

2. The process according to claim 1, wherein mechanical separation of the ore particles from the suspension is accomplished successively in a hydrocyclone and a filter.

3. The process according to claim 1, wherein the oxide-containing iron ore is a haematite ore.

4. The process according to claim 1, wherein the aqueous solution of hydrochloric acid contains more than 20% by weight of hydrochloric acid.

5. The process according to claim 1, further comprising the steps of recovering the aqueous solution of ferric chloride separated in step (c); and concentrating the aqueous solution by partial evaporation thereof.

6. The process according to claim 1, wherein the bed is a stationary bed.

* * * * *